US008912926B2

(12) United States Patent
Burns et al.

(10) Patent No.: US 8,912,926 B2
(45) Date of Patent: Dec. 16, 2014

(54) IDENTIFYING A POTENTIAL VEHICLE INCIDENT WITHIN A COMMUNICATION BLACK SPOT

(75) Inventors: Simon E. Burns, Winchester (GB); Nicholas C. Maynard, Winchester (GB); Alasdair Nottingham, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/405,315

(22) Filed: Feb. 26, 2012

(65) Prior Publication Data

US 2012/0154179 A1 Jun. 21, 2012

Related U.S. Application Data

(63) Continuation of application No. 13/284,790, filed on Oct. 28, 2011, now Pat. No. 8,692,692.

(30) Foreign Application Priority Data

Nov. 18, 2010 (EP) .................................... 10191733

(51) Int. Cl.
*G08G 1/123* (2006.01)

(52) U.S. Cl.
CPC ...................................... *C08G 1/205* (2013.01)
USPC ............................ 340/994; 340/438; 340/901

(58) Field of Classification Search
USPC ......... 340/994, 435, 903, 436, 438, 443, 439, 340/463–465, 472, 901–902, 904
See application file for complete search history.

(56) References Cited

U.S. PATENT DOCUMENTS

| | | | | |
|---|---|---|---|---|
| 6,721,572 | B1 | 4/2004 | Smith et al. | |
| 7,991,522 | B2 * | 8/2011 | Higgins-Luthman | 701/28 |
| 8,160,616 | B2 | 4/2012 | Jain et al. | |
| 8,310,355 | B2 * | 11/2012 | Chen et al. | 340/435 |
| 8,692,692 | B2 * | 4/2014 | Burns et al. | 340/994 |
| 2006/0284760 | A1 * | 12/2006 | Natsume | 342/70 |
| 2009/0063053 | A1 * | 3/2009 | Basson et al. | 702/1 |
| 2009/0096634 | A1 * | 4/2009 | Emam et al. | 340/901 |

(Continued)

OTHER PUBLICATIONS

Parkany, Emily, "A Complete Review of Incident Detection Algorithms & Their Deployment: What Works and What Doesn't," Prepared for the New England Transportation Consortium, Feb. 7, 2005, http://www.netc.uconn.edu/pdf/netcr37_00-7.pdf.

(Continued)

*Primary Examiner* — Daniel Previl
(74) *Attorney, Agent, or Firm* — Winstead, P.C.

(57) ABSTRACT

A method for identifying a potential vehicle incident within a communication black spot. It is identified when a vehicle has entered a communication black spot. It is further identified when the vehicle has failed to exit the communication black spot within a determined time period. It is then determined whether it is likely that the vehicle has failed to exit the communication black spot within the determined time period due to being involved in an incident (or whether there is another reasonable explanation for a vehicle's failure to exit). If it is determined that it is likely that the vehicle has been involved in an incident within the communication black spot, a third party can be alerted (by a service provider) to the potential that an incident has occurred within the communication black spot.

9 Claims, 5 Drawing Sheets

(56) References Cited

U.S. PATENT DOCUMENTS

| | | | | |
|---|---|---|---|---|
| 2010/0271720 | A1* | 10/2010 | Marenco | 359/843 |
| 2011/0026543 | A1 | 2/2011 | Nakaya et al. | |
| 2011/0082623 | A1* | 4/2011 | Lu et al. | 701/41 |

OTHER PUBLICATIONS

Kamran, et al., "A Multilevel Traffic Incidents Detection Approach: Identifying Traffic Patterns and Vehicle Behaviours Using Real-Time GPS Data," Proceedings of the 2007 IEEE Intelligent Vehicles Symposium, Istanbul, Turkey, Jun. 13-15, 2007, pp. 912-917.

Abuelela et al., "Enhancing Automatic Incident Detection Techniques Through Vehicle to Infrastructure Communication," Proceedings of the 11th International IEEE Conference on Intelligent Transportation Systems, Beijing, China, Oct. 12-15, 2008, pp. 447-452, http://www.asmemesa.org/itsc08/ITSC2008/papers/0293.pdf.

* cited by examiner

IDENTIFYING A POTENTIAL VEHICLE INCIDENT WITHIN A COMMUNICATION BLACK SPOT

CROSS-REFERENCE TO RELATED APPLICATIONS

The present application is a continuation application of pending U.S. patent application Ser. No. 13/284,790, which was filed on Oct. 28, 2011, which is assigned to the assignee of the present invention. The present application claims priority benefits to U.S. patent application Ser. No. 13/284,790, which claims priority under 35 U.S.C. §119(a) from European Patent Application No. 10191733.4, filed on Nov. 18, 2010, the contents of which are incorporated herein by reference.

TECHNICAL FIELD

The present invention relates to the monitoring of vehicles, and more particularly, to the identification of a potential incident occurring in relation to a vehicle within a communication black spot.

BACKGROUND

There are various known technologies for detecting vehicle incidents. For example, incidents can be detected by Accelerometer-Based Crash Detection (ABCD) of the type used in airbag firing circuits.

Detecting incidents and reporting these incidents to a central hub via radio, satellite etc. can be an unreliable process if the vehicle involved is in a communication black spot. This is especially true in isolated locations where it may be some time before help arrives.

BRIEF SUMMARY

In one embodiment of the present invention, a method for identifying a potential vehicle incident within a communication black spot comprises identifying that a vehicle has entered a communication black spot. The method further comprises identifying that the vehicle has failed to exit the communication black spot within a determined time period. Additionally, the method comprises determining whether it is likely that the vehicle has failed to exit the communication black spot within the determined time period due to being involved in an incident. In addition, the method comprise responsive to a determination that it is likely that the vehicle has been involved in the incident within the communication black spot, alerting, by a processor, a third party to a potential that the incident has occurred within the communication black spot.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
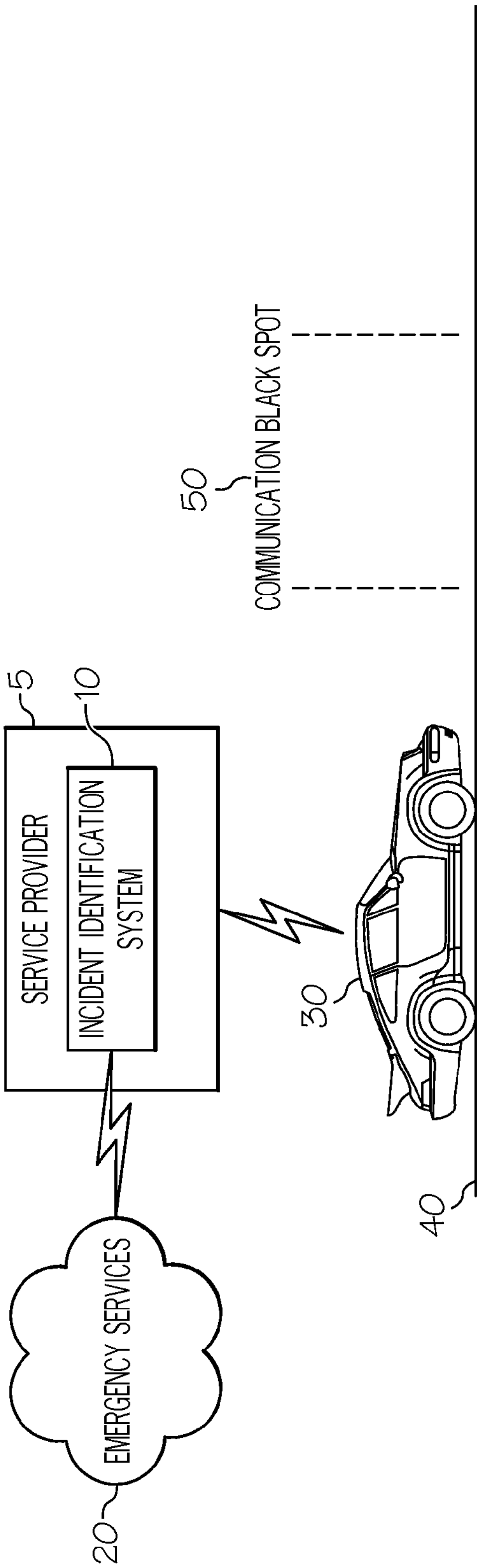
FIG. 1 illustrates the communications among the components involved in identifying a potential vehicle incident within a communication black spot in accordance with an embodiment of the present invention.

A loss of signal with respect to the vehicle may be used to identify that a vehicle has entered a communication black spot. Vehicle positional information and information about at least one known black spot may be used to identify that a vehicle has entered a communication black spot.

Information on the size of the black spot and average vehicle traversal times may be used to identify that a vehicle has failed to exit the black spot within the determined time period. Other factors may also be taken into account. For example, weather conditions, driver habits, roadworks, road type, vehicle type and traffic levels.

In one embodiment, it is determined whether it is likely that the vehicle has failed to exit the communication black spot within the determined time period due to being involved in an incident by establishing the most likely destination for the vehicle and identifying whether the most likely destination for the vehicle is within the communication black spot.

Such a determination may be made using at least one of: phone records, driver records, satellite navigation information, driver habits, social networking information, email information, calendaring information, hotel booking information, place of work, home destination and driver profile data.

In one embodiment, once it has been identified that the most likely destination for the vehicle is outside of the communication black spot, the system continues to monitor for the vehicle's exit from the communication black spot. A third party (e.g., an emergency service) is only alerted to the potential that an incident has occurred within the communication black spot if the vehicle has still failed to exit the black spot after a maximum period of time.

In one embodiment, in order to determine whether it is likely that the vehicle has failed to exit the communication black spot within the determined time period due to being involved in an incident, the progress of at least one other vehicle through the communication black spot is taken account of (e.g., whether another vehicle has exited the black spot within a time period that is determined to be acceptable). Of course the time period for the other vehicle may be different from that determined to be acceptable for the original vehicle.

In one embodiment, in order to determine whether it is likely that the vehicle has been involved in an incident, at least one sufficiently likely destination is established for the vehicle. It is then identified whether the established sufficiently likely destinations are within the communication black spot. The establishment of at least one sufficiently likely destination can take into account at least one of the following: phone records, driver records, satellite navigation information, driver habits, social networking information, email information, calendaring information, hotel booking information, place of work, home destination and driver profile data.

In this embodiment, responsive to identifying that all sufficiently likely destinations for the vehicle are outside of the communication black spot, the system continues to monitor for the vehicle's exit from the communication black spot; and only alerts a third party to the potential that an incident has occurred within the communication black spot if the vehicle has still failed to exit the black spot after a maximum period of time.

A sufficiently likely destination may be defined by a probability threshold. This threshold may be tunable.

In one embodiment, at least one of the emergency services is alerted if it is likely that an incident has occurred involving the original vehicle within the communication black spot.

It will be appreciated that there may not be a separate component for performing each processing function described above (nor may a separate component be shown in the Figures for each processing function). Some components may perform more than one function.

In one embodiment, the principles of the present invention may also be implemented in computer software.

A system is disclosed which is able to monitor a vehicle and identify when it is likely that the vehicle has been involved in an incident. Exemplary incidents may include an accident (either involving another vehicle(s) or without third party involvement) or a vehicle breakdown. Such a system can notify the emergency services (or other third party) according to rules defined within the system.

Identification of a vehicle incident and subsequent notification can be seen as relatively trivial under normal conditions. For example, in the case of an incident occurring on a busy route such as a motorway, systems already exist to detect incidents (CCTV etc.). On-site reporting (mobile phones) and onboard devices can ensure a high likelihood that the emergency services will be dispatched to the scene as appropriate.

However, in the case of an incident occurring in an isolated area or communication (reception) black spot, current accident detection/reporting methods are deficient because they only work in situations where data can be provided remotely (e.g., by an onboard accident reporting system). When a vehicle enters a communication black spot, a lack of data makes decisions about what is required more difficult.

FIG. 1 illustrates the communications among the components involved in identifying a potential vehicle incident within a communication black spot in accordance with an embodiment of the present invention Referring to FIG. 1, a service provider 5 receives information from a vehicle 30 travelling by road 40. Such a vehicle preferably comprises one or more onboard devices which under normal circumstances provide data to the service provider 5. This data may be GPS data from a satellite navigation system and enables the service provider to follow a vehicle's progress along a route. The componentry for tracking vehicle progress in this way is not shown in the Figure.

As indicated above, communication black spots 50 exist. A communication black spot is an area from which no data signal can be provided or from which the data signal is not a constant one. When vehicle 30 enters communication black spot 50, incident identification system 10 is operable to perform analysis (when appropriate) to determine the likelihood that the vehicle has been involved in an incident within the section of road covered by area 50.

Figure 2:
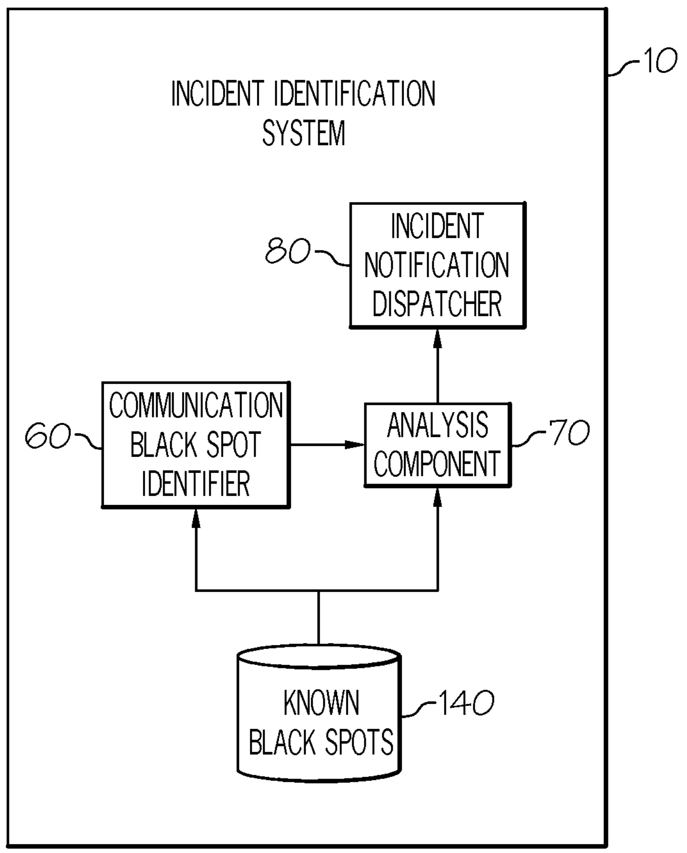
FIG. 2 illustrates the components of the incident identification system in accordance with an embodiment of the present invention.
Figure 3:
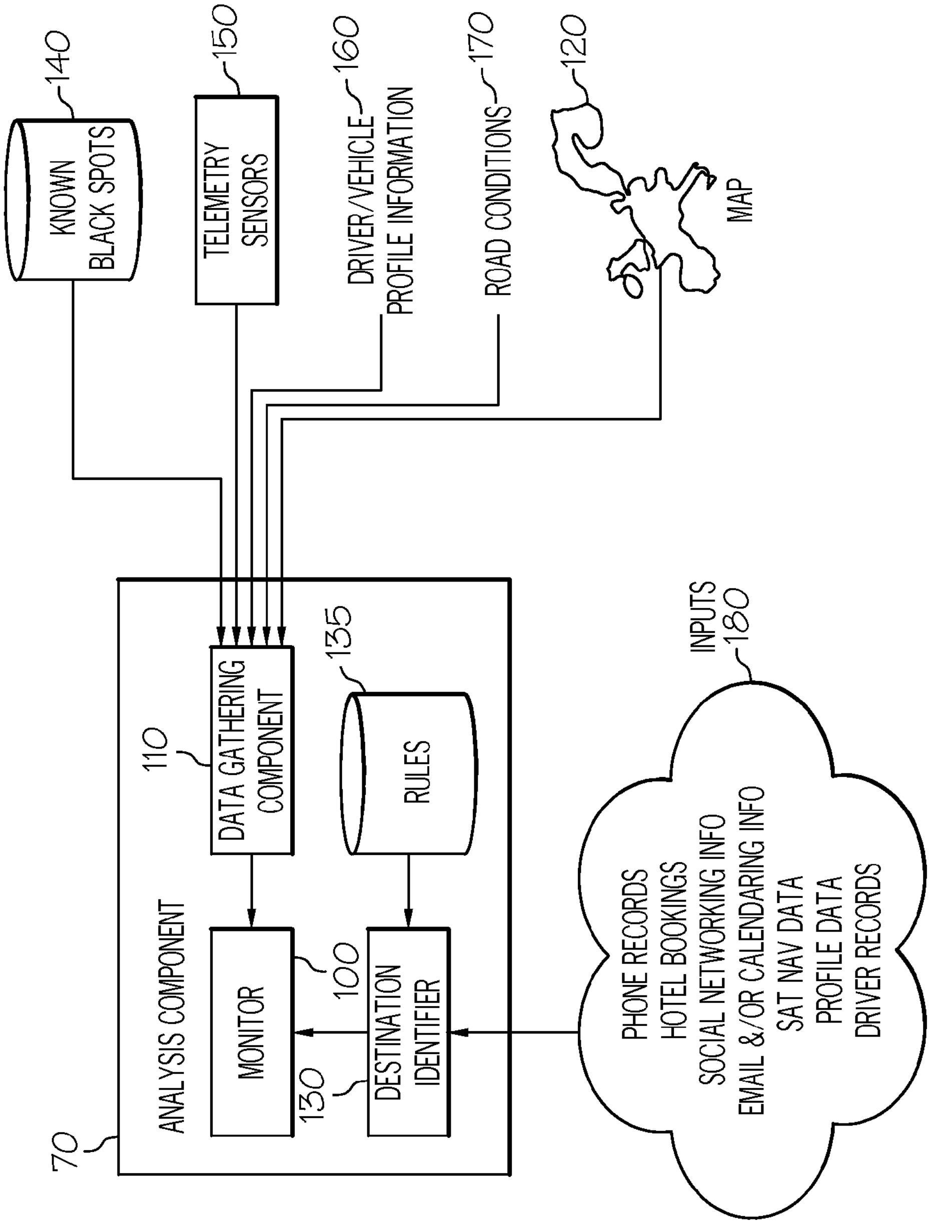
FIG. 3 illustrates the analysis component within the incident identification system in accordance with an embodiment of the present invention.
Figure 4:
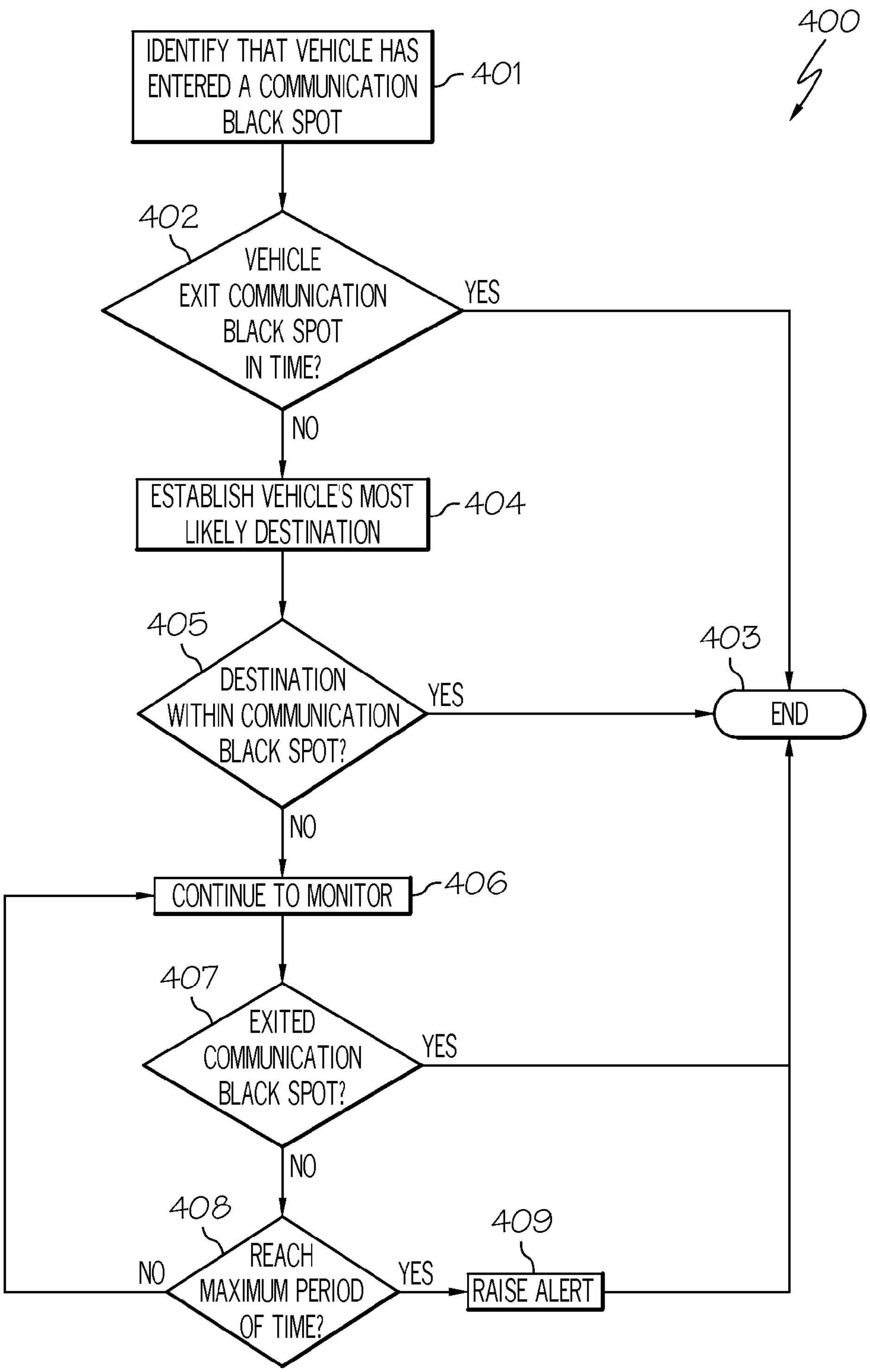
FIG. 4 is a flowchart of a method for identifying a potential vehicle incident within a communication black spot in accordance with an embodiment of the present invention.

FIGS. 2 and 3 illustrate, in accordance with an embodiment of the present invention, the incident identification system in more detail. In particular, FIG. 2 illustrates the components of the incident identification system in accordance with an embodiment of the present invention. FIG. 3 illustrates an analysis component within the incident identification system of FIG. 2 in accordance with an embodiment of the present invention. FIG. 4 is a flowchart of a method 400 for identifying a potential vehicle incident within a communication black spot that is preferably performed by the componentry of FIGS. 2 and 3 in accordance with an embodiment of the present invention. The Figures should be read in conjunction with one another.

Referring to FIGS. 1-4, communication black spot identifier component 60 is able to identify at step 401 when a vehicle is likely to have entered such a black spot. Such an identification may be made based on the signal (or lack of signal) received by service provider 5. System 10 may also use information 140 about known black spots and is able to make such a determination in conjunction with information about the vehicle's last known position and data signal information. Information 140 may be stored within a database within system 10 or elsewhere.

Once it is determined that a vehicle has in all likelihood entered a communication black spot, additional analysis is preferably performed by analysis component 70. If the analysis component determines that vehicle 30 has in all likelihood been involved in an incident, then incident notification dispatcher 80 can notify a third party, such as the emergency services 20. This however will be discussed in greater depth later.

The analysis performed to identify the likelihood that vehicle 30 has been involved in an incident will first be discussed. Such analysis is preferably performed by analysis component 70. The componentry of the analysis component is shown in more detail, in accordance with an embodiment of the present invention, in FIG. 3.

Referring to FIGS. 1-4, monitor 100 determines at step 402 whether the vehicle has exited communication black spot 50 within a period of time (a "determined time period") that is identified as being acceptable. It is determined that a vehicle has exited a black spot when a signal is received from that vehicle by service provider 5. Preferably the signal should be identified as a relatively constant one.

In the case where signal information alone is being used, incident identification system 10 (particularly monitor 100) determines a time period that it is prepared to wait before deciding that an incident may have occurred and therefore investigating the situation further. Use of signal information alone may not, however, be particularly accurate since black spots may be of different lengths or may be affected by environmental and other conditions. One size may therefore not fit all.

In order to take account of such varying conditions, monitor 100 takes input from data gathering component 110 in order to make the determination at step 402.

As indicated, system 10 may make use of information about known black spots (database 140). Such information may indicate, for example, the coordinates of the black spot, the size of the black spot (e.g., geographical area or mobile cell size) and the average time it should take a vehicle to pass through that black spot.

It will be appreciated that a communication black spot may have multiple possible exits and these can be identified using mapping information 120. The time a vehicle takes to exit a black spot may depend upon the exit selected. System 10 may therefore use the furthest exit as the threshold for deciding whether the vehicle has exited within a time period determined as being acceptable.

Satellite navigation systems are already proficient at estimating the time that a vehicle is likely to take to traverse a section of road and thus this aspect will not be discussed in any more detail.

As alluded to above, it may also make sense to take account of environmental conditions, such as the weather. For example, wind direction and speed or icy roads may make a difference to a vehicle's speed. Such information may be provided to the data gathering component 110 by external telemetry sensors 150. Whilst it will typically not be possible to transmit precise environmental data relating to the section of road within communication black spot 50, telemetry sensors 150 may provide, for example, information on the area immediately proximate to (e.g., before) the communication black spot. Such information will give a good idea as to likely conditions within the section of road covered by the black spot itself.

Other factors may affect the length of time a vehicle takes to exit area 50, such as the type of road, driver's habits, roadworks, traffic levels (entering the black spot), type of vehicle, etc. These can all be taken into account.

A device onboard vehicle 30 may be transmitting vehicle and driver profile information 160 to the data gathering component 110 up until the point at which communication is lost due to the communication black spot 50. External systems (e.g., traffic reporting systems) may also be transmitting information 170 on traffic levels entering communication black spot 50 and roadworks planned for the section of road covered by black spot 50.

It would of course be possible for other vehicles passing through a black spot to gather information about, for example, road and environmental conditions 170 and to transmit this information once they had exited the communication black spot.

Inputs 150, 160 and 170 are preferably provided by systems external to service provider 5. Information on known black spots 140 may be stored somewhere within service provider 5 (FIG. 2 shows this information being held in a database by the incident identification system 10) or may be provided from an external source.

Data gathering component 110 is shown within the analysis component 70 but may instead sit elsewhere within the incident identification system 10 or indeed somewhere else within service provider 5. Of course, an external system (data gathering component) may alternatively provide such information to service provider 5.

The information gathered by data gathering component 110 is used by monitoring component 100 to determine a period of time within which vehicle 30 would be expected to have exited communication black spot 50.

If it is determined at step 402 that a vehicle has exited within the determined period of time, then processing ends at step 403.

Alternatively, if a vehicle has not exited within the determined period of time, then the analysis component 30 determines whether there is a reasonable explanation for a vehicle's delayed departure (i.e., one that does not require an alert to be raised).

In one embodiment, such a reasonable explanation relates to the vehicle's most likely destination. This is explained in more detail below.

At step 404, the vehicle's most likely destination is established using destination identifier 130. This step may involve identifying a number of possible destinations and weighting these in order to select the most likely destination.

It is then determined by the destination identifier 130 at step 405 whether the established destination is within the communication black spot.

One or more factors may be taken into account when identifying the most likely destination and also when determining whether that destination is within the communication black spot.

The likely driver of vehicle 30 is first preferably identified. This may be achieved, for example, by using driver information transmitted to service provider 5 prior to entering the black spot or by accessing online records in conjunction with the vehicle's registration number. (Of course, more than one driver may be registered against a particular vehicle and it may be necessary to consider each driver in turn. It would, however, be possible to capture the driver's photo prior to entering the black spot and to use this to identify the driver. This would however result in a more expensive solution.)

Driver information can be used in conjunction with any of the following (inputs 180):

1) The vehicle's satellite navigation system may have been pre-programmed with destination information. Such information may have previously been provided to service provider 5;

2) Phone record information may be accessed. Such information that a phone call was placed or received from a person living within the black spot and that such a call was made shortly before the vehicle entered the black spot;

3) Hotel booking information may be accessed and this may indicate that the vehicle is destined for a hotel located within the black spot;

4) Social networking information may indicate that the driver has a close friend or relative living within the communication black spot;

5) Email or calendaring information may also prove useful; and

6) It may be known (using profile data) that a driver historically stops in a certain area—e.g., their place of work or home is within the communication black spot.

The possible inputs given are exemplary only. Others may be used and combinations of inputs may also be used.

The use of driver information may not always be essential (e.g., if the decision is based on a pre-programmed satellite navigation system destination).

Destination identifier component 130 uses input(s) 180 and rule(s) 135 to make deductions about a vehicle's likely destination and the location of such a destination. Thus, a rule may specify that if a phone call was made to a person x, living within black spot 50, shortly before the vehicle entered area 50, then it is highly likely that the vehicle has intentionally stopped off within the communication black spot and consequently that no action is required. Additional information may be used to confirm this assumption. For example, the driver of vehicle 30 may have a calendar entry indicating a meeting within the appropriate time frame with person x. Further, the driver may have posted additional information (e.g., status information) indicating that they are on their way to meet person x.

Indeed, social networking information may prove very useful in making deductions about whether someone has intentionally stopped off within communication's black spot 50. This is because people often post information about their intended whereabouts, their friends, their relatives etc.

Some of the inputs 180 may be stored in one or more databases external to the incident identification system 10. Incident identification system 10 may comprises a component (not shown) for requesting certain of the inputs from various third party systems (including one or more of the databases) and for providing that information in an appropriate format to destination identifier 130.

If it is established that a vehicle's destination is within the black spot, then processing can end at step 403. There is no need to notify anyone and monitor component 100 can be informed of this fact. It should be appreciated that a vehicle's destination may not be that vehicle's final destination but merely an intermediate one (e.g., a friend en-route etc.).

If, on the other hand, it is determined at step 405 that the vehicle's destination is unlikely to be within the black spot, then system 10 continues to monitor (using monitor component 100) for a reappearance of the vehicle (step 406).

As indicated above, there may be some reasonable (non incident related) reason for the vehicle's delay and thus it may be determined at step 407 whether the vehicle exited the black spot after all. If so, then processing can end at step 403.

If not, then system 10 (monitor 100) continues monitoring until a maximum period of time has been reached (step 408). That is, a determination is made at step 260 as to whether the maximum period of time has been reached.

Whilst steps 406 through to 408 are not essential, they allow for a margin of error. System 10 (monitor 100) may adapt its maximum limit based on changing weather conditions, etc. It may additionally allow for the vehicle slowing down, temporarily stopping, etc. Information about other vehicles entering the black spot may also be taken into account. For example, if another vehicle enters the same black spot shortly after the first and also fails to reappear, then this may be indicative of a problem (maybe the second vehicle has stopped to help the first). On the other hand, if the other vehicle passes through the black spot in a timely manner, maybe there is no incident to report. It will be appreciated that this information may be used together with or instead of information on the vehicle's likely destination. In other words, one solution may not concern itself with the vehicle's likely destination at all.

If it is determined that an incident is likely to have occurred within the communication black spot (i.e., the maximum period of time has been reached), then incident notification dispatcher 80 is invoked by monitor 100 and dispatcher 80 then raises an alert (step 409) and the emergency services 20 (or other entity) is notified.

If, however, the maximum period of time has not been reached, then system 10 continues to monitor (using monitor component 100) for a reappearance of the vehicle (step 406).

It will be appreciated that selecting the destination that is most likely for a vehicle will typically involve a "best guess." In some circumstances, the most likely destination may be the best choice from a set of fairly unlikely possibilities. If a planned route in a satellite navigation system indicates a destination within the black spot or a person goes to a destination regularly (especially on a given day/time), then it may be fair to assume that this is where a vehicle is likely to be headed. On the other hand, the driver of the vehicle may be associated with someone (living or working, etc., within the communication black spot) via a social networking site but there may be no record of them ever visiting that person. In this example, it is unlikely that this is the vehicle's destination, but nevertheless, this may be the best choice given the other possibilities. Of course, if the set of choices are all fairly unlikely, it may be preferable to base the decision on whether to raise an alert on other factors, such as the progress (or lack of) of other vehicle(s) through the communication black spot. Alternatively, the system could choose to raise the alert anyway; however, this may result in an undesirable number of false alarms.

Instead of identifying whether a vehicle's most likely destination is within the black spot (and deciding whether or not to raise an alert on this basis), it will be appreciated that there is another alternative. In one embodiment, it is instead identified whether there is at least one "sufficiently likely" destination within the communication black spot. Whether a destination is sufficiently likely may be based on a probability threshold (which may be tunable). For example, a destination may be classified as sufficiently likely if there is a greater than 45% probability that the destination is within the black spot. If one such destination exists, then it may be decided that there is no need to raise an alert.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Figure 5:
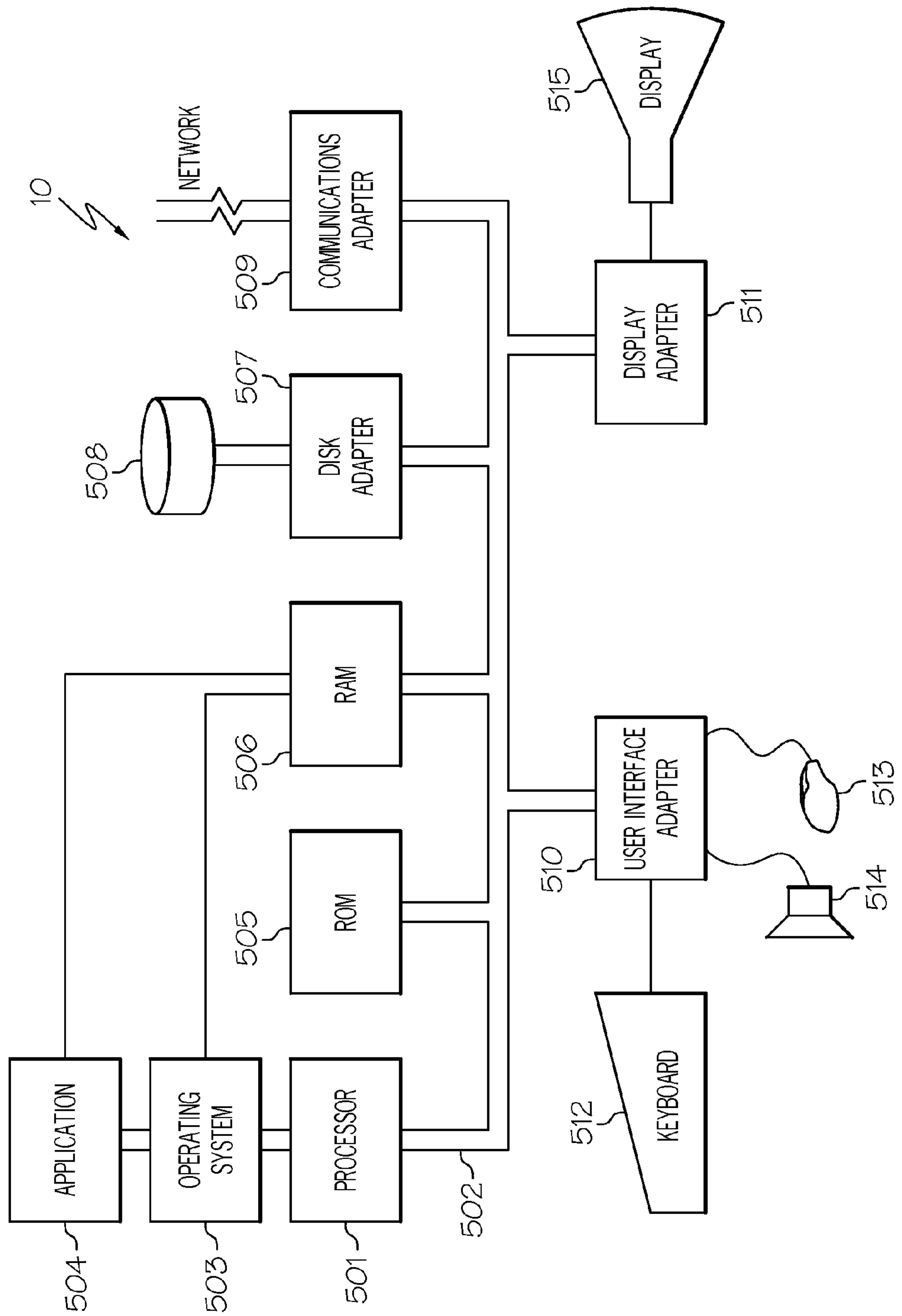
FIG. 5 depicts an embodiment of a hardware configuration of the incident identification system which is representative of a hardware environment for practicing the present invention.

FIG. 5 depicts an embodiment of a hardware configuration of an incident identification system 10 which is representative of a hardware environment for practicing the present invention. Referring to FIG. 5, incident identification system 10 has a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for identifying a potential vehicle incident within a communication black spot as discussed above.

Referring again to FIG. 5, read-only memory ("ROM") 505 may be coupled to system bus 502 and include a basic input/output system ("BIOS") that controls certain basic functions of incident identification system 10. Random access memory ("RAM") 506 and disk adapter 507 may also be coupled to system bus 502. It should be noted that software components including operating system 503 and application 504 may be loaded into RAM 506, which may be incident identification system's 10 main memory for execution. Disk adapter 507 may be an integrated drive electronics ("IDE") adapter that communicates with a disk unit 508, e.g., disk drive.

Incident identification system 10 may further include a communications adapter 509 coupled to bus 502. Communications adapter 509 may interconnect bus 502 with an outside network (not shown) thereby allowing incident identification system 10 to communicate with other similar devices.

I/O devices may also be connected to incident identification system 10 via a user interface adapter 510 and a display adapter 511. Keyboard 512, mouse 513 and speaker 514 may all be interconnected to bus 502 through user interface adapter 510. A display monitor 515 may be connected to system bus 502 by display adapter 511. In this manner, a user is capable of inputting to incident identification system 10 through keyboard 512 or mouse 513 and receiving output from incident identification system 10 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying a potential vehicle incident within a communication black spot, the method comprising:

identifying that a vehicle has entered a communication black spot;

identifying that the vehicle has failed to exit the communication black spot within a determined time period;

determining whether the vehicle has likely failed to exit the communication black spot within the determined time period due to being involved in an incident; and responsive to a determination that the vehicle has likely been involved in the incident within the communication black spot, alerting, by a processor, a third party to a potential that the incident has occurred within the communication black spot.

2. The method as recited in claim 1, wherein the identifying that the vehicle has entered the communication black spot comprises:

identifying a loss of signal with respect to the vehicle.

3. The method as recited in claim 1, wherein the identifying that the vehicle has entered the communication black spot comprises:

using vehicle positional information and information about at least one known black spot.

4. The method as recited in claim 1, wherein the identifying that the vehicle has failed to exit the black spot within the determined time period comprises:

using information on a size of the black spot and average vehicle traversal times.

5. The method as recited in claim 4, wherein the identifying that the vehicle has failed to exit the black spot within the determined time period further comprises:

taking into account at least one of the following: weather conditions, driver habits, roadworks, road type, vehicle type and traffic levels.

6. The method as recited in claim 1, wherein the determining whether it is likely that the vehicle has failed to exit the communication black spot within the determined time period due to being involved in the incident comprises:

establishing a most likely destination for the vehicle; and identifying whether the most likely destination for the vehicle is within the communication black spot.

7. The method as recited in claim 6, wherein the establishing the most likely destination for the vehicle comprises taking into account at least one of the following: phone records, driver records, satellite navigation information, driver habits, social networking information, email information, calendaring information, hotel booking information, place of work, home destination and driver profile data.

8. The method as recited in claim 6 further comprising:

responsive to identifying that the most likely destination for the vehicle is outside of the communication black spot, continuing to monitor for the vehicle's exit from the communication black spot; and only alerting the third party to the potential that the incident has occurred within the communication black spot in response to the vehicle failing to exit the black spot after a maximum period of time.

9. The method as recited in claim 1, wherein the determining whether it is likely that the vehicle has failed to exit the communication black spot within the determined time period due to being involved in the incident comprises:

establishing at least one destination that is sufficiently likely for the vehicle; and identifying whether the established at least one destination is within the communication black spot.

* * * * *